United States Patent [19]

Ellingsen

[11] Patent Number: 5,735,114
[45] Date of Patent: Apr. 7, 1998

[54] THERMOSTATIC BIMETALLIC RETAINING RING FOR USE IN ROCKET MOTOR ASSEMBLY

[75] Inventor: Warren W. Ellingsen, Lewisville, Pa.

[73] Assignee: Thiokol Corporation, Ogden, Utah

[21] Appl. No.: 745,531

[22] Filed: Aug. 15, 1991

[51] Int. Cl.[6] ........................... F02K 1/00
[52] U.S. Cl. .............. 60/39.1; 102/481; 220/89.4
[58] Field of Search ............. 60/39.1, 253; 239/265.15; 220/201, 89.4; 102/481

[56] References Cited

U.S. PATENT DOCUMENTS

| | | | |
|---|---|---|---|
| H1144 | 3/1993 | Cherry et al. | 60/39.1 |
| 3,665,857 | 5/1972 | Radnich et al. | 102/481 |
| 3,887,991 | 6/1975 | Panella | 60/253 |
| 3,927,791 | 12/1975 | Hershberger | 220/89.4 |
| 4,458,482 | 7/1984 | Vetter et al. | 60/253 |
| 4,478,151 | 10/1984 | Vetter et al. | 102/481 |
| 4,784,061 | 11/1988 | Christopher | 102/481 |
| 4,838,166 | 6/1989 | Spies et al. | 102/481 |
| 5,036,658 | 8/1991 | Tate | 60/253 |
| 5,311,820 | 5/1994 | Ellingsen | 102/481 |

*Primary Examiner*—Michael J. Carone
*Attorney, Agent, or Firm*—Cushman Darby & Cushman IP Group of Pillsbury Madison & Sutro, LLP; Ronald L. Lyons, Esq.

[57] ABSTRACT

A device for safely attaching sections of a rocket motor is disclosed. The device is constructed such that if the temperature of the rocket motor is elevated to the point where ignition of the propellant within the rocket motor becomes a significant danger, the device allows the sections of the motor to disengage. The device comprises a bimetallic retaining ring which either contracts or expands in diameter upon heating. The retaining ring is positioned in such a manner as to lockingly engage two sections of the rocket motor at normal temperatures. At elevated temperatures, however, the expansion or contraction of the bimetallic retaining ring causes the sections of the motor to unlock from one another, such that if the propellant ignites the sections will disengage and the rocket will be rendered non-propulsive.

19 Claims, 2 Drawing Sheets

THERMOSTATIC BIMETALLIC RETAINING RING FOR USE IN ROCKET MOTOR ASSEMBLY

BACKGROUND

1. The Field of the Invention

The present invention is related to an apparatus and method for rendering a rocket motor non-propulsive when subjected to an external heat source of predetermined intensity. More particularly, the present invention is related to a bimetallic retaining ring which releases the engagement between two or more sections of a rocket motor when contacted by an external heat source of predetermined intensity.

2. Technical Background

A serious problem encountered in the handling of devices containing propellant materials is the potential for accidental ignition of the propellant. This potential is present in any context where propellant materials are used, including aerospace and military rockets, as well as conventional explosives.

Many types of situations may lead to an increase in temperature of a propellant containing vessel. Any dramatic increase in the temperature of the propellant containing vessel will likely lead to a potentially dangerous situation. Perhaps the most obvious situation would be in the event of fire. However, simple exposure to direct sunlight or storage in a hot storage building could also lead to the potential of unintentional ignition of the propellant.

It is obvious that military devices containing propellants are constantly in danger of encountering an external heat source or fire. The action of combatants in a battle situation necessarily involves inflicting devices on one another that cause fire, explosion, or an increase in temperature. At the same time, the operation of military equipment has a high potential for fire caused by the fuels, explosives and other materials being handled. As was mentioned above, military operations in hot climates may also expose propellant containing vessels to external heat through sunlight or storage.

The same problems arise in non-military contexts. In aerospace operations, fire is a constant concern. Aerospace operations often involve flammable fuels, chemicals, and other materials. Accordingly, the potential for unintentionally exposing propellants to high levels of external heat is always a possibility. Even in the case of propellants used for other conventional purposes, such as mining, exposure to fire is a major concern.

Accordingly, there have been some attempts to render ineffective a device contain propellant in the event of fire or other unexpected application of external heat. Such procedures seek to render such rocket motors "non-propulsive." It is obviously a major problem to have rocket motors igniting in the event of a fire aboard a ship, a tank, or an aircraft or space vehicle, in case of fire. As a result, attempts of been made to disable such rocket motors in case of unexpected increases in temperature.

One such attempted solution relates to a method and apparatus for venting pressure within the rocket motor in case of accidental ignition of the propellant. Such a devices, however, are generally extremely complex. Such devices may involve equipping the rocket motor with a gas generator, which in turn operates a piston. The piston is driven into a charge which transfers explosive energy to the motor casing by a relatively complex mechanism. As a result of the energy of the charge impacting the motor casing, the motor casing is stressed to the point that ignition of the propellant causes the casing to fail, venting the pressure generated by the propellant.

While the general concept of venting the pressure generated by the propellant is sound, the mechanism conventionally provided has many limitations. The mechanism is very complex and expensive to manufacture and install in the rocket motor. In addition, because of the complexity of the mechanism, failure of the device is increasingly likely. Accordingly, this type of thermally actuated safety system is found to be less than totally satisfactory.

Another mechanism for rendering a rocket motor non-propulsive upon accidental ignition comprises a wire which is threaded between various sections of the rocket motor in order to hold the sections in place. The wire is attached by means of a locking clip constructed of a soft metal, having a relatively low melting point, such as aluminum. The wire and the locking clip are installed under tension such that when the locking clip is released, the wire springs outwardly, releasing the sections of the rocket motor from one another.

In operation, when temperatures reach approximately 400° F. the aluminum locking clip losses strength and the locking clip fails. Accordingly, the closures are freed from the motor case, apparently allowing the pressure from the propellant to vent. This renders the rocket motor at least partially non-propulsive.

Problems with this approach are apparent. The proposed temperature of release is approximately 400° F. Many propellants are known to ignite in "slow cook off" conditions in the 225° F. to 300° F. range. Accordingly, it is very possible for the rocket motor to accidentally ignite at temperatures significantly below the failure temperature of the aluminum clip.

In addition, the square wire used in such devices has its own drawbacks. There are a limited number of materials that can be configured in the manner provided in this type of device. Hard materials would fracture during manufacture, so that a soft material, such as steel, is usually used. However, when using this type of material there is insufficient elastic strain energy available to spring the wire out of position upon failure of the aluminum clip. Accordingly, it is a distinct possibility that the device will fail to operate as planned.

Accordingly, it would be an advancement in the art to provide an effective mechanism for rendering harmless a propellant containing vessel in case of exposure to an unexpected external heat source. It would be another advancement in the art to provide such a mechanism which was simple and inexpensive to manufacture and install. It would be a related advancement in the art to provide such a mechanism which was simple and reliable in operation. It would also be an advancement in the art to provide a mechanism for reliably rendering a rocket motor non-propulsive at temperatures above a predetermined safe temperature.

Such an apparatus and methods are disclosed and claimed herein.

BRIEF SUMMARY AND OBJECTS OF THE INVENTION

The present invention is related to an apparatus and method for rendering a rocket motor non-propulsive when subjected to an external heat source of predetermined intensity. The invention employs a bimetallic retaining ring which releases the engagement between two or more sections of a rocket motor when contacted by an external heat source. The invention could also be employed in other contexts in which propellant or explosive is stored within an enclosed vessel.

It will be appreciated that the conventional rocket is constructed of a series of separate and distinct sections. For purposes of understanding this invention, only three of the most common sections will be discussed. The invention could also be applied in rockets having a different number of sections or having different closure mechanisms. However, the sections to be considered herein include a forward closure, an intermediate propellant containing section, and a nozzle section. Conventionally, these three sections are securely attached to one another.

The present invention provides an improved method of attaching the sections to one another. In particular, the present invention teaches the use of a bimetallic retaining ring to secure the sections in locking engagement at normal operating and storage temperatures. The sections of the rocket motor are configured such that when assembled they define a groove in the region where the sections join. The bimetallic retaining ring is configured such that it fits within the groove.

The groove, however, is also configured such that there is room for the diameter of the retaining ring to either expand or contract upon heating. When this occurs, the retaining ring moves from the area within the ring where the ring effects attachment of the sections, to an area of the groove where the ring contacts only one section of the rocket motor.

In operation, the retaining ring is placed within the groove such that the subject sections of the rocket motor are secured to one another at normal ambient temperatures. In the event ambient temperatures rise above a pre-determined level, however, the retaining ring either expands or contracts, depending on the particular design of the device. In expanding or contracting, the retaining ring disengages one section of the rocket motor, allowing it to disengage from the remainder of the rocket motor. The temperature at which this occurs is below the ignition temperature of the subject propellant.

If the temperature continues to rise and the propellant ignites, the pressure generated by the burning propellant pushes the rocket motor sections apart. In the case of a rocket motor having three sections, both the nozzle and the forward closure will be pushed free of the propellant containing section. Thus, the propellant may exhaust out both ends of the intermediate propellant section. In doing so, insufficient thrust in any particular direction is generated to cause propulsion of the rocket. Thus, the present invention provides a significant improvement in the safety of the rocket motor.

Accordingly, it is an object of the present invention to provide an effective mechanism for rendering harmless a propellant containing vessel in case of exposure to an unexpected heat source.

It is another object of the present invention to provide such a mechanism which was simple and inexpensive to manufacture and install.

It is a related object of the invention to provide a safety mechanism for rendering a rocket motor non-propulsive which is simple and reliable in operation.

It is also an object of the invention to provide a mechanism for reliably rendering a rocket motor non-propulsive at temperatures above a predetermined safe temperature.

These and other objects and advantages of the invention will become apparent upon reading the following detailed description and appended claims, and upon reference to the accompanying drawings.

DETAILED DESCRIPTION OF THE PREFERRED EMBODIMENTS

Figure 1:
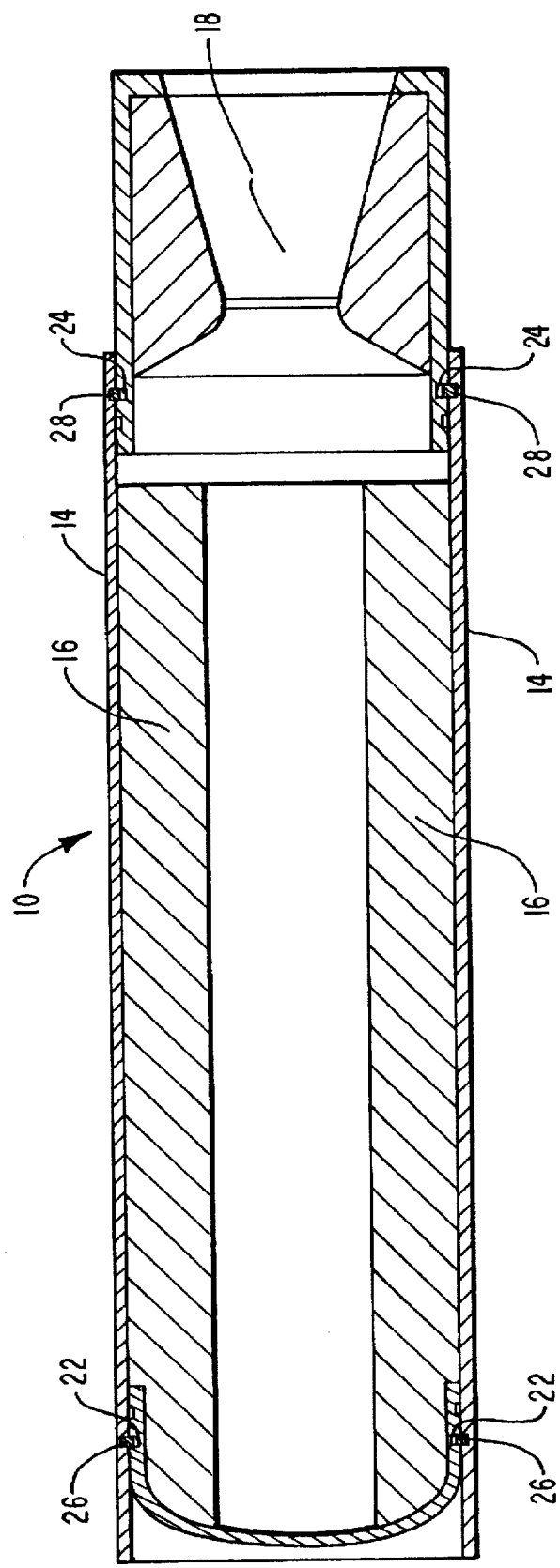
FIG. 1 is a cross sectional plan view of a rocket motor equipped with the present invention.

The present invention can be best understood with reference to the attached drawings wherein like parts are designated with like numerals throughout. FIG. 1 is a cross sectional plan view of a rocket motor designated 10. While rocket motor 10 is used to illustrate the operation of the present invention, it will be appreciated that the present invention will find wide application in any type of device containing a propellant of the type used in rocket motors. The device may also find application in other types of devices used to contain explosive materials.

Three basic sections of the rocket motor 10 are illustrated. Illustrated in FIG. 1 is a forward closure 12. Also illustrated is an intermediate casing 14 containing propellant 16. This section of the rocket motor is sometimes referred to herein as the propellant section of the rocket motor 10. Finally, a conventional nozzle section 18 is illustrated.

Also illustrated in FIG. 1 is the junction between the forward closure 12 and the propellant section 14, as well as the junction between the propellant section 14 and the nozzle section 18. As can be seen, the propellant section 14 overlaps both the nozzle section 18 and the forward closure 12. In order to hold the sections in locking engagement, the sections are configured such that they define radial grooves 22 and 24 running the circumference of the forward closure 12 and nozzle section 18 respectively.

The sections are locked together by retaining rings 26 and 28 which are disposed within grooves 22 and 24 respectively. The retaining rings 26 and 28 are configured such that they rest in the grooves and engage two adjoining sections when the device is kept at normal operating or storage temperatures. That configuration is illustrated in FIG. 1.

It will be appreciated that it is necessary for the bimetallic ring to be constructed such that it is pre-loaded against the outside diameter of the grooves 22 and 24 at normal operating and storage temperatures. As will be discussed in additional detail below, as the temperature increases, the pre-load decreases. As the temperature reaches the upper limit of the operational temperature range, the pre-load reaches essentially zero. As the temperature increases into the danger zone, the retaining ring contracts until it no longer engages both sections of the rocket motor.

In typical rocket motor operation and storage, the ambient temperature is not expected to exceed approximately 160° F. to approximately 200° F. It is known, however, that many propellants can ignite in slow cook off conditions in the 225° F. to 300° F. range. Accordingly, for most applications it will be preferred to provide a bimetallic ring which contracts or expands through the chosen diameters at temperatures below 225° F., but above approximately 160° F.

Figure 2:
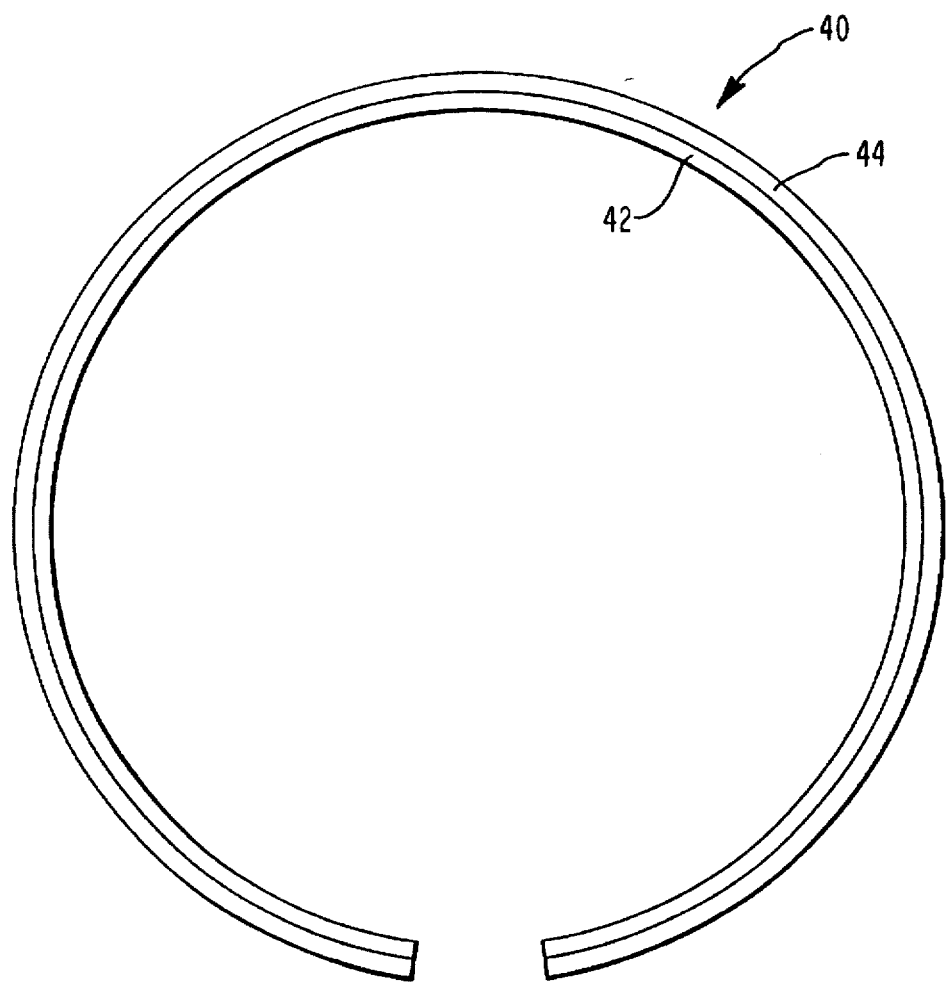
FIG. 2 is a plan view of one embodiment of the retaining ring of the present invention.

The actual construction of the retaining ring can be more fully appreciated with reference to FIG. 2. FIG. 2 is a plan view of one embodiment of the bimetallic ring 40. The ring comprises an inner ring 42 of a specific chosen material, and an outer ring 44 of a second material. The materials are joined together by known means. Acceptable methods of joining the inner and outer rings would including methods such as roll welding, explosive welding, or diffusion bonding.

In the embodiment of the device illustrated in FIG. 1, the outer ring 42 will be constructed of a material having a relatively high coefficient of thermal expansion. Such materials include brass and aluminum. At the same time, the inner ring 44 will be constructed of a material having a relatively low coefficient of thermal expansion. Such materials would include Invar or steel. Other materials having similar coefficients of thermal expansion are also acceptable.

When the bimetallic rings are placed within a rocket motor or other storage vessel, as the temperature rises, the ring contracts in diameter. This is caused by the fact that the outer ring expands much more rapidly than the inner ring, in the same general manner as a bimetallic thermostat. The reduction of diameter per incremental temperature increase is a function of the percent variance in the coefficients' of thermal expansion of the two materials, as well as the actual dimensions of the metals.

Figure 3:
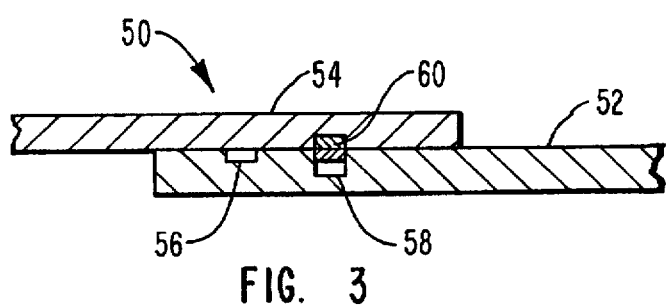
FIG. 3 is a cross sectional view of the retaining ring placed within a groove formed by sections of the rocket motor, illustrating the engaged position at normal temperatures.

In order to illustrate the method of operation of the invention reference is made to FIG. 3 wherein a joint 50 is illustrated. The joint 50 may, for example, be the joint between the forward closure and the propellant section, or the propellant section and the nozzle section. The joint 50 is comprised of a first rocket motor section 52 and a second overlapping rocket motor section 54. A typical O-ring seal 56 is also illustrated in FIG. 3. As will be appreciated, the first section 52 and the second section 54 are constructed such that they cooperate to form a circumferential groove 58.

FIG. 3 also illustrates a bimetallic retaining ring 60 disposed within the groove 58. As is shown in FIG. 3, the retaining ring 60 is seated against the outside diameter of the overlapping second section 54. In this position, the retaining ring 60 also engages, and locks into place, the first section 52. Thus, the various components are in a locking engagement at this temperature.

Figure 4:
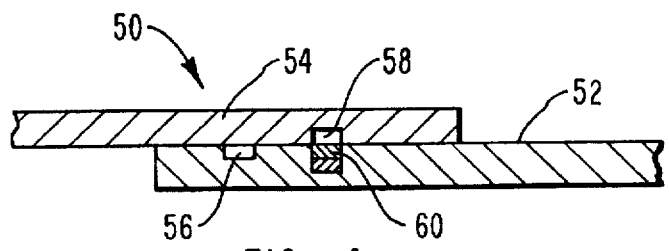
FIG. 4 is a cross sectional view of the retaining ring of the present invention in place within a groove but in the disengaged position because of elevated temperature.

When the temperature of the device increases, the retaining ring 60 contracts by the mechanisms discussed above. As the temperature moves into the range where ignition of the subject propellant is a possibility, the retaining ring 60 moves inwardly in the manner illustrated in FIG. 4. In this position, the sections 52 and 54 can easily be disengaged in that the retaining ring no longer locks them together. If the propellant located within the rocket motor were to ignite, pressure produced by the burning propellant would push the sections apart, venting the generated thrust. Thus, the propellent would burn relatively harmlessly, rather than causing propulsion of the rocket motor which would cause a potentially hazardous situation.

It will be appreciated that the present invention could be designed such that the retaining ring expands upon rising temperature rather than contracts. Such an embodiment would essentially represent the reverse of the illustrated embodiment. In addition, while a rocket motor was used to illustrate the usefulness of the present invention, it will be appreciate that the invention may find application in a wide variety of contexts where propellants or explosives are housed in a container.

In summary, the present invention provides an effective mechanism for rendering harmless a propellant containing vessel in case of exposure to an unexpected heat source. The present invention also provides such a mechanism which is simple and inexpensive to manufacture and install. In addition, the present invention is simple and reliable in operation and effectively and reliably renders a rocket motor non-propulsive at temperatures above a predetermined safe temperature.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A rocket motor comprising:

a propellant section;

a forward closure section; and means for attaching the propellant section to the forward closure section comprising a retaining ring configured such that the retaining ring holds both sections in locking engagement when the rocket motor is at temperatures below a chosen temperature, said retaining ring changing diameter sufficiently at temperatures above said chosen temperature such that it allows said sections to disengage and wherein said retaining ring comprises a bimetallic ring.

2. A rocket motor as defined in claim 1 wherein said bimetallic ring comprises at least two different metals with different coefficients of thermal expansion bonded together.

3. A rocket motor as defined in claim 2 wherein the retaining ring comprises an outer metal having a higher coefficient of thermal expansion and an inner metal having a lower coefficient of thermal expansion.

4. A rocket motor as defined in claim 3 wherein the outer metal is selected from the group consisting of brass and aluminum.

5. A rocket motor as defined in claim 3 wherein the inner metal is selected from the group consisting of steel and invar.

6. A rocket motor as defined in claim 1 wherein said propellant section and said forward closure section together define a groove when attached to one another, which groove is configured to house the retaining ring such that at temperatures below the chosen temperature the retaining ring engages both sections, but at temperatures above the chosen temperature the retaining ring engages only one of said sections.

7. A rocket motor as defined in claim 1 further comprising a nozzle section attached to said propellant section by means of a second retaining ring.

8. A rocket motor as defined in claim 1 wherein said chosen temperature is approximately 200° F.

9. A retaining ring for securely attaching sections of an apparatus housing at least one propellant or explosive rocket motor to one another, said ring comprising a bimetallic ring constructed in such a manner that the retaining ring is capable of engaging multiple sections of said apparatus when said ring is below a chosen temperature, said ring changing diameter sufficiently at temperatures above said chosen temperature that it is no longer capable of engaging multiple sections of said apparatus.

10. A retaining ring as defined in claim 9 wherein said apparatus comprises a rocket motor.

11. A retaining ring as defined in claim 10 wherein the bimetallic ring comprises at least two different matals with different coefficients of thermal expansion bonded together.

12. A retaining ring as defined in claim 11 wherein the retaining ring comprises an outer metal having a higher coefficient of thermal expansion and an inner metal having a lower coefficient of thermal expansion.

13. A retaining ring as defined in claim 12 wherein the outer metal is selected from the group consisting of brass and aluminum.

14. A retaining ring as defined in claim 12 wherein the inner metal is selected from the group consisting of steel and invar.

15. A method for attaching sections of a rocket motor to one another such that they become detached at temperatures above a chosen temperature, comprising the steps of:

a. obtaining a first section of a rocket motor;

b. obtaining a second section of a rocket motor;

c. obtaining a retaining ring which is configured such that it engages both sections of the rocket motor at temperatures below a chosen temperature, and said retaining ring being constructed such that it changes diameter sufficiently at temperatures above said chosen temperature that it no longer engages both sections; and d. attaching said first section to said second section by means of said retaining ring and wherein said retaining ring comprises a bimetallic ring.

16. A method for attaching sections of a rocket motor as defined in claim 15 wherein said bimetallic ring comprises at least two different metals with different coefficients of thermal expansion bonded together.

17. A method for attaching sections of a rocket motor as defined in claim 15 wherein said first section and said second section together define a groove when attached to one another, which groove is configured to house the retaining ring such that at temperatures below the chosen temperature the retaining ring engages both sections, but at temperatures above the chosen temperature the retaining ring engages only one of said sections.

18. A method for attaching sections of a rocket motor as defined in claim 15 further comprising a nozzle section attached to said propellant section by means of a second retaining ring.

19. A method for attaching sections of a rocket motor as defined in claim 15 wherein said chosen temperature is approximately 200° F.

* * * * *